W. C. SMITH.
VEHICLE ATTACHMENT.
APPLICATION FILED JULY 29, 1919.

1,383,668.

Patented July 5, 1921.

WITNESS:
R. A. Thomas

INVENTOR.
BY W. C. Smith.
Victor J. Evans
ATTORNEY.

UNITED STATES PATENT OFFICE.

WALTER C. SMITH, OF WATERTOWN, NEW YORK.

VEHICLE ATTACHMENT.

1,383,668.  Specification of Letters Patent.  Patented July 5, 1921.

Application filed July 29, 1919. Serial No. 314,008.

*To all whom it may concern:*

Be it known that I, WALTER C. SMITH, a citizen of the United States, residing at Watertown, in the county of Jefferson and State of N. Y., have invented new and useful Improvements in Vehicle Attachments, of which the following is a specification.

This invention relates to vehicle attachments and has for an object the provision of a device, which may be removably secured to a vehicle, for the purpose of shielding the eyes of the driver from the lights of an approaching vehicle, or other glare, and thereby prevent temporary blinding and confusion, while the vehicle is being driven.

Another object is the provision of a device of this character, which may be attached to a vehicle and easily and quickly moved into and out of position for use.

A further object is the provision of a non-glare device which may be removably secured to the wind shield of a vehicle, and which is capable of adjustment so as to adapt it to wind shields having glass of different widths.

Other objects and advantages of the invention will appear as the following description is read in connection with the accompanying drawings.

In the drawings.

Referring in detail to the drawings, wherein like characters of reference denote corresponding parts, there is indicated at 10 the top bar of the frame of a vehicle wind shield and at 11 the forward adjacent portion of the vehicle top.

Figure 1:
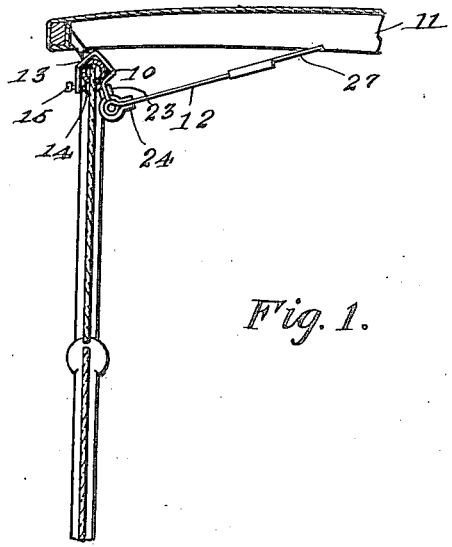
Figure 1 is a fragmentary sectional view of a portion of the wind shield and top of a vehicle, with the invention applied thereto and shown in raised position.
Figure 2:
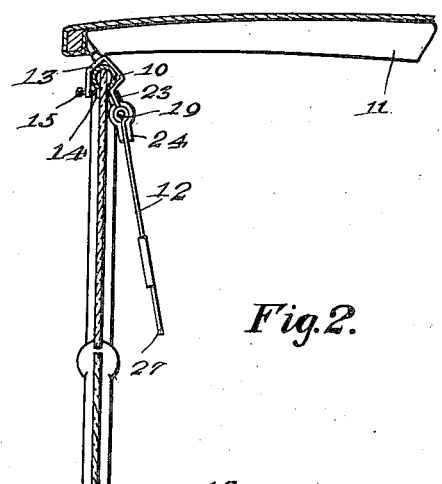
Fig. 2 is a fragmentary elevation of the subject matter of Fig. 1, with the invention shown lowered or in position for use.
Figure 3:
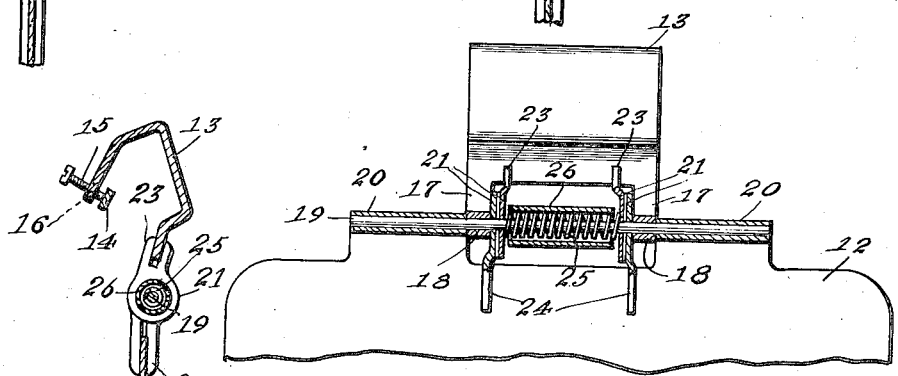
Fig. 3 is an enlarged section taken on a line with the pivot pin.
Figure 5:
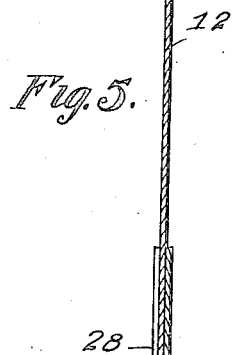
Fig. 5 is a transverse section through the non-glare plate on the line 5—5 of Fig. 2.
Figure 4:
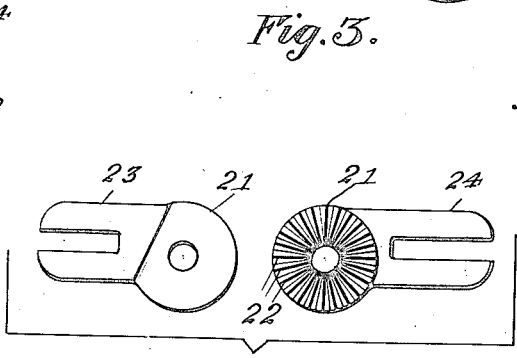
Fig. 4 is a detail perspective of one pair of positioning members shown separated.
Figure 6:
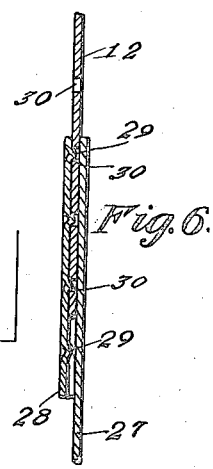
Fig. 6 is a similar view on the line 6—6 of Fig. 2.

The invention, which is designed to interrupt the glare of the lights of an approaching vehicle and is adapted to be removably secured to the bar 10, comprises a plate 12, which is of suitable size and shape and made of metal or any suitable material. This plate is secured to the bar 10 by means of a clamp, which includes a body member 13 bent into proper shape for engagement over the bar 10, and carrying at one end a short bar 14, to each end of which is swiveled a screw 15, the said screws passing through threaded openings 16 provided in the said body member.

The opposite end of the body member is provided with spaced extensions 17, which terminate in ears 18 and these ears receive a pivot pin 19, which is also received in spaced ears 20, projecting from the edge of the plate 12. The plate 12 is thus pivotally secured to the clamp so that it may be lowered or raised into and out of position for use. When in use the plate occupies a position transversely of the glass of the wind shield and is adapted to shield the eyes of the driver from either the glare of the lights of an approaching vehicle or the sun, the plate being positioned so as to obstruct the glare of the lights and at the same time permit the driver to obtain a view of the road and his surroundings. When out of use the plate is raised to a position beneath the top of the vehicle, as shown in Fig. 1.

In order to hold the plate against accidental movement when in either a raised or lowered position, there is mounted upon the pivot pin 19, adjacent each of the ears 18, a pair of positioning members. These members are formed of apertured disks 21, through which the pin 19 passes, the opposed faces of these disks being provided with teeth or serrations 22 to prevent accidental relative movement. Extending from one disk of each pair is a slotted arm 23 for engagement with the adjacent end of the clamp 13, while a similarly slotted arm 24 extends from the other disk for engagement with the adjacent edge of the plate 12. Each pair of disks are yieldingly held in contact by means of a spring 25, which surrounds the pin 19 and is in turn housed within a spacing sleeve 26 positioned between the disks. The plate 12 may thus be easily and quickly moved into either a lowered or raised position and through the medium of the positioning members will be securely held against accidental movement.

To adapt the device to wind shields having glass of different widths, the plate 12 is provided with an extension 27, each edge of which is provided with an inturned flange 28, so as to provide a guide groove for the plate 12. The inturned flanges 28 are formed with spaced inwardly extending projections 29, which may be formed by punching inwardly the material and these projections are adapted for engagement with openings 30 provided adjacent the opposite sides of the plate 12.

It is, of course, obvious that these projections and openings may be dispensed with and flanges 28 formed of a material sufficiently resilient to provide a frictional engagement between the extension 17 and the plate 12, to permit of a proper adjustment of the length of the plate.

The invention is susceptible of various changes in its form, proportions and minor details of construction and the right is hereby reserved to make such changes as properly fall within the scope of the appended claims.

Having described the invention, what is claimed is:

1. A vehicle attachment comprising a plate, a removable extension for said plate, means including yieldably disposed projections engageable in sockets for adjustably securing the extension to the plate and means for securing the plate to the frame of a wind shield in a manner to permit of its adjustment to either a vertical or horizontal position.

2. A non-glare attachment for vehicles comprising a plate, means for securing the plate to a vehicle wind shield to interrupt the passage of light, a longitudinally slidable extension for said plate, whereby the area of interrupted light may be regulated and means for yieldingly holding the extension in adjusted position.

3. A non-glare attachment for vehicles comprising a plate, a clamp for removably securing the plate to a vehicle, spaced ears extending from the clamp and having openings therein, spaced ears extending from the plate and also having openings therein, a pivot pin extending from the openings in the ears, positioning devices mounted upon the pin and contacting with the ears, a spring for yieldingly holding the ears in contacting position and a spacing sleeve surrounding the spring and located between the positioning devices.

In testimony whereof I affix my signature.

WALTER C. SMITH.